(12) United States Patent
Yuzawa et al.

(10) Patent No.: US 9,409,246 B2
(45) Date of Patent: Aug. 9, 2016

(54) WIRE ELECTRIC DISCHARGE MACHINING APPARATUS AND COOLING CONTROL DEVICE

(71) Applicants: Takashi Yuzawa, Chiyoda-ku (JP); Takashi Hashimoto, Chiyoda-ku (JP); Takayuki Nakagawa, Chiyoda-ku (JP); Yoichi Otomo, Chiyoda-ku (JP)

(72) Inventors: Takashi Yuzawa, Chiyoda-ku (JP); Takashi Hashimoto, Chiyoda-ku (JP); Takayuki Nakagawa, Chiyoda-ku (JP); Yoichi Otomo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 406 days.

(21) Appl. No.: 13/977,808

(22) PCT Filed: Oct. 30, 2012

(86) PCT No.: PCT/JP2012/078060
§ 371 (c)(1),
(2) Date: Jul. 1, 2013

(87) PCT Pub. No.: WO2014/068678
PCT Pub. Date: May 8, 2014

(65) Prior Publication Data
US 2014/0116989 A1 May 1, 2014

(51) Int. Cl.
*B23H 11/00* (2006.01)
*B23H 1/10* (2006.01)
(52) U.S. Cl.
CPC . *B23H 11/00* (2013.01); *B23H 1/10* (2013.01)
(58) Field of Classification Search
CPC .............. B23H 1/10; B23H 7/02; B23H 7/04; B23H 7/20; B23H 7/36
USPC ............... 219/69.11, 69.12, 69.13, 69.14
See application file for complete search history.

(56) References Cited

U.S. PATENT DOCUMENTS

| | | | |
|---|---|---|---|
| 6,008,461 A | 12/1999 | Iezawa et al. | |
| 2007/0278190 A1* | 12/2007 | Kita | B23H 1/10 219/69.12 |
| 2012/0048832 A1 | 3/2012 | Kasai et al. | |

FOREIGN PATENT DOCUMENTS

| | | |
|---|---|---|
| JP | 09-216131 A | 8/1997 |
| JP | 10-315057 A | 12/1998 |
| JP | 2006-130630 A | 5/2006 |

(Continued)

OTHER PUBLICATIONS

International Search Report for PCT/JP2012/078060, dated Jan. 29, 2013.

*Primary Examiner* — Brian Jennison
(74) *Attorney, Agent, or Firm* — Sughrue Mion, PLLC

(57) ABSTRACT

The present invention includes a post-cooling temperature sensor that measures a temperature of the machining fluid immediately after being cooled by a cooling device as a post-cooling fluid temperature, and an intra-tank temperature sensor that measures a temperature of the machining fluid in a work tank as an intra-tank fluid temperature, for a cooling control device that controls a fluid temperature of the machining fluid in a wire electric discharge machining apparatus, and the cooling control device has a first temperature-feedback control unit that feeds back the post-cooling fluid temperature into a cooling instruction value as an instruction value for the cooling device, and a second temperature-feedback control unit adjusts the cooling instruction value by feeding back the intra-tank fluid temperature to cause the intra-tank fluid temperature to follow a target temperature.

12 Claims, 7 Drawing Sheets

(56) References Cited

FOREIGN PATENT DOCUMENTS

| JP | 2007-319943 A | 12/2007 |
| JP | 2009-279670 A | 12/2009 |
| JP | 2010-115757 A | 5/2010 |
| JP | 2010-125556 A | 6/2010 |
| JP | 2012-066377 A | 4/2012 |

* cited by examiner

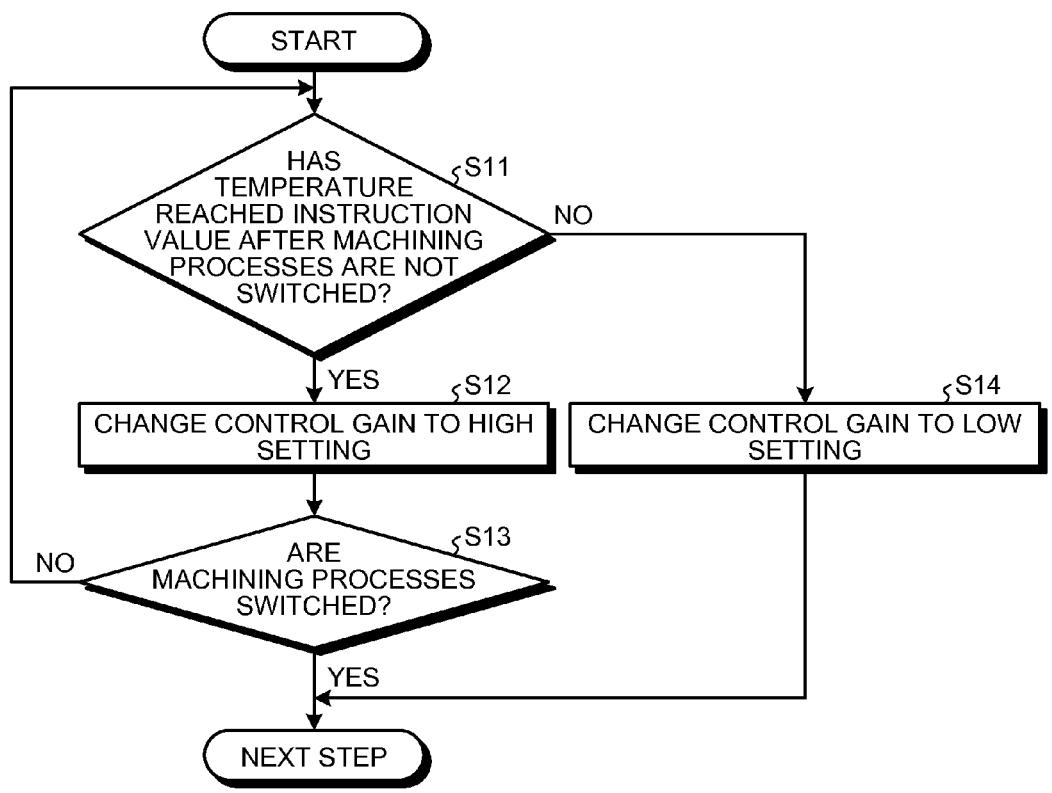

WIRE ELECTRIC DISCHARGE MACHINING APPARATUS AND COOLING CONTROL DEVICE

CROSS REFERENCE TO RELATED APPLICATIONS

This application is a National Stage of International Application No. PCT/JP2012/078060 filed Oct. 30, 2012, the contents of all of which are incorporated herein by reference in their entirety.

FIELD

The present invention relates to a wire electric discharge machining apparatus and a cooling control device that execute a temperature control on a machining fluid.

BACKGROUND

A wire electric discharge machining apparatus applies a voltage to a gap formed between a wire electrode and a workpiece (a machined object) and causes electric discharge, thereby machining the workpiece. In the wire electric discharge machining apparatus, a machining fluid is interposed between the wire electrode and the workpiece to achieve insulation, cooling, and elimination of machined chips. The temperature of the machining fluid rises due to electric discharge caused between the electrode and the workpiece and heat generation of a pump that supplies the machining fluid to a work tank in which the workpiece is placed.

When the temperature of the machining fluid in the work tank rises, the workpiece, a table to which the workpiece is fixed, and a machine structure deform due to a thermal expansion, which leads to reduction in a machining accuracy or deterioration in a surface roughness. Furthermore, a cooling efficiency in an interpolar portion decreases and thus the wire electrode may be broken. Accordingly, the wire electric discharge machining apparatus has a cooling device that cools the machining fluid in the work tank.

To suppress reduction in the machining accuracy resulting from a thermal influence of the machining fluid, not only the rise in the temperature of the machining fluid is simply suppressed but also the machining fluid needs to be kept at a predetermined temperature. To execute a temperature control on the machining fluid, a temperature sensor is arranged in the work tank, for example. The machining fluid supplied into the work tank is cooled (temperature controlled) so that the temperature measured by the temperature sensor follows a target temperature.

For example, a conventional wire electric discharge machining apparatus includes a cooling device, a plurality of temperature sensors (first to third temperature sensors), and a fluid surface detector that detects the height of a fluid surface of the machining fluid. The first temperature sensor detects a temperature of the machining fluid cooled by the cooling device, the second temperature sensor detects a temperature of the work tank, and the third temperature sensor detects a machine temperature. This wire electric discharge machining apparatus selects one of the first and second temperature sensors based on a signal output by the fluid surface detector according to the height of the fluid surface. The wire electric discharge machining apparatus cools the machining fluid to cause the temperature of the machining fluid detected by the selected temperature sensor to approach a target temperature detected by the third temperature sensor (see, for example, Patent Literature 1).

Another conventional wire electric discharge machining apparatuses uses two types of machining fluids such as water and oil according to cases. This wire electric discharge machining apparatus adopts a method of cooling oil with water used as a refrigerant, for example. In this method, the oil machining fluid is likely to have a temperature higher than that of the water machining fluid. Accordingly, the wire electric discharge machining apparatus uses an offset feedforward amount to set a target temperature in the case of using oil lower than a target temperature in the case of using water. In a machining mode that uses oil, the offset feedforward amount is set to a higher value than that in a machining mode that uses water (see, for example, Patent Literature 2).

CITATION LIST

Patent Literatures

Patent Literature 1: Japanese Patent Application Laid-open No. 2010-125556
Patent Literature 2: Japanese Patent Application Laid-open No. 2009-279670

SUMMARY

Technical Problem

However, in the former of the conventional technologies, when a temperature sensor is switched to be selected, it becomes difficult to keep constant the temperature in the work tank before and after switching the temperature sensor. For example, when the temperature sensor outside the work tank is used, an accurate temperature in the work tank can not be measured. On the other hand, when the temperature sensor inside the work tank is used, a responsiveness of the temperature control deteriorates because a location of the temperature is far from a cooling location of the machining fluid. When a control gain is increased in order to improve the responsiveness of the temperature control, a magnitude of temperature deviation become large. In particular, in conditions which temperature disturbances occur, it becomes difficult to keep constant the temperature of the machining fluid in the work tank.

While the offset feedforward amount to lower the target temperature needs to be set according to a heat generation amount for each condition in the latter conventional technique, the heat generation amount varies according to changes in external environments. However, the offset feedforward amount cannot be changed according to variations in the heat generation amount. In some changes of the external environments, it is difficult to keep the temperature in the work tank constant.

The present invention has been achieved in view of these problems, and an object of the present invention is to provide a wire electric discharge machining apparatus and a cooling control device that can enhance responsiveness of a temperature control on a machining fluid and can suppress temperature variations in the machining fluid in a work tank.

Solution to Problem

In order to solve the above problems and to achieve the object, according to an aspect of the present invention, there is provided a wire electric discharge machining apparatus including: a work tank that is filled with a machining fluid and in which a machining of a workpiece is performed; a machining-fluid supply device that supplies the machining fluid to the work tank; a cooling device that cools the machining fluid; a cooling control device that controls a fluid temperature of the machining fluid by controlling the cooling device; a post-cooling temperature sensor that measures a temperature of the machining fluid immediately after being cooled by the cooling device as a post-cooling fluid temperature; and an intra-tank temperature sensor that measures a temperature of the machining fluid in the work tank as an intra-tank fluid temperature, wherein the cooling control device includes a first temperature-feedback control unit that feeds back the post-cooling fluid temperature into a cooling instruction value that is an instruction value for causing the cooling device to cool the machining fluid to a predetermined temperature, and a second temperature-feedback control unit that is arranged outside the first temperature-feedback control unit and adjusts the cooling instruction value by feeding back the intra-tank fluid temperature to cause the intra-tank fluid temperature to follow a target temperature.

Advantageous Effects of Invention

According to the present invention, responsiveness of a temperature control on a machining fluid can be enhanced and temperature variations in the machining fluid in a work tank can be suppressed.

BRIEF DESCRIPTION OF DRAWINGS

FIG. 4-1 depicts a result of a conventional fluid temperature control.

FIG. 4-2 depicts a result of the fluid temperature control according to the first embodiment.

FIG. 9 is a flowchart of a fluid-temperature control process procedure after machining processes are switched.

DESCRIPTION OF EMBODIMENTS

A wire electric discharge machining apparatus and a cooling control device according to embodiments of the present invention will be explained below in detail with reference to the accompanying drawings. The present invention is not limited to the embodiments.

First Embodiment

Figure 1:
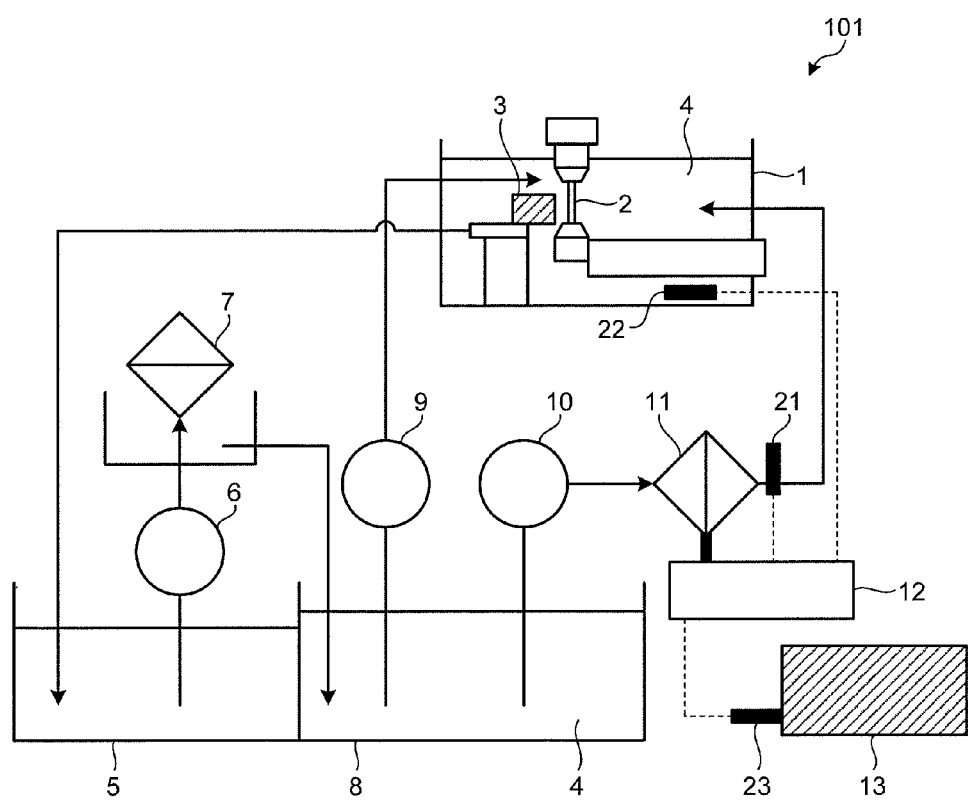
FIG. 1 depicts a configuration of a wire electric discharge machining apparatus according to a first embodiment.

FIG. 1 depicts a configuration of a wire electric discharge machining apparatus according to a first embodiment of the present invention. The wire electric discharge machining apparatus 101 applies a voltage to a gap formed between a wire electrode 2 and a workpiece (a machined object) 3 and causes an electric discharge, thereby machining the workpiece 3.

The wire electric discharge machining apparatus 101 includes a work tank 1, a dirty fluid tank 5, a clean fluid tank 8, a filter pump 6, a machining fluid pump 9, a circulation pump 10, and a filter 7. The wire electric discharge machining apparatus 101 also includes a cooling device 11, a cooling control device 12, a machine structure 13, and first to third temperature sensors.

The first temperature sensor is a temperature sensor (hereinafter, "post-cooling temperature sensor 21") that measures a temperature of a machining fluid 4 immediately after being cooled by the cooling device 11. The second temperature sensor is a temperature sensor (hereinafter, "intra-tank temperature sensor 22") that measures a temperature of the machining fluid 4 in the work tank 1. The third temperature sensor is a temperature sensor (hereinafter, "machine temperature sensor 23") that measures a temperature of the machine structure 13. The temperature of the machining fluid 4 is hereinafter referred to as a fluid temperature and the temperature of the machine structure 13 is referred to as a machine temperature.

The work tank 1 is a tank in which the workpiece 3 is machined. The dirty fluid tank 5 recovers the machining fluid 4 having machined chips mixed in the work tank 1. The clean fluid tank 8 stores therein the machining fluid 4 having undergone filtration after recovery by the dirty fluid tank 5.

The filter pump 6 pumps up the machining fluid 4 recovered by the dirty fluid tank 5 and feeds the pumped machining fluid 4 to the filter 7. The filter 7 filters the machining fluid 4 pumped up by the filter pump 6. The machining fluid pump 9 pumps up the machining fluid 4 stored in the clean fluid tank 8 and feeds the pumped machining fluid 4 to the work tank 1. The circulation pump 10 pumps up the machining fluid 4 stored in the clean fluid tank 8 and feeds the pumped machining fluid 4 to the cooling device 11.

The cooling device 11 cools the machining fluid 4 according to an instruction from the cooling control device 12. The cooling device 11 according to the present embodiment cools the machining fluid 4 to a desired temperature to suppress temperature variations in the machining fluid 4 in the work tank 1.

The post-cooling temperature sensor 21 as the first temperature sensor, the intra-tank temperature sensor 22 as the second temperature sensor, and the machine temperature sensor 23 as the third temperature sensor are connected to the cooling control device 12. The cooling control device 12 controls the cooling device 11 based on the fluid temperatures and the machine temperature detected by the first to third temperature sensors.

The workpiece 3 is placed at a position facing the wire electrode 2 in the work tank 1. The work tank 1 is filled with the machining fluid 4. Because the machined chips produced by electric discharge are mixed in the machining fluid 4 stored in the work tank 1, the work tank 1 is configured to flow the machining fluid 4 out of the work tank 1 to the dirty fluid tank 5.

A procedure of circulating the machining fluid 4 is explained. The machining fluid 4 in the work tank 1 is recovered by the dirty fluid tank 5. The machining fluid 4 recovered and stored by the dirty fluid tank 5 is pumped up by the filter pump 6 and is filtered through the filter 7. The machining fluid 4 filtered by the filter 7 is supplied to the clean fluid tank 8 with the machined chips removed therefrom.

The machining fluid 4 supplied to the clean fluid tank 8 has a cycle of being resupplied to the work tank 1 by the machining fluid pump 9 and the circulation pump 10. The machining fluid 4 supplied to the work tank 1 by the circulation pump 10 is cooled to a target temperature via the cooling device 11.

At that time, the cooling control device 12 controls the cooling device 11 based on the fluid temperatures and the machine temperature detected by the first to third temperature sensors. In this way, the wire electric discharge machining apparatus 101 executes a temperature control on the machining fluid 4 based on the temperatures detected by the first to third temperature sensors.

Figure 2:
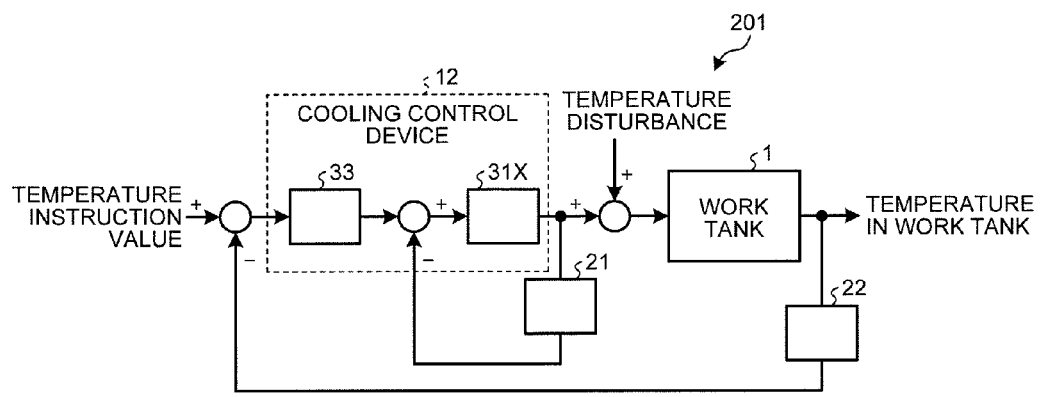
FIG. 2 is an explanatory diagram of a concept of a first example of a fluid-temperature control method according to the first embodiment.

FIG. 2 is an explanatory diagram of a concept of a first example of a fluid-temperature control method according to the first embodiment. The wire electric discharge machining apparatus 101 includes a fluid-temperature control mechanism 201. The fluid-temperature control mechanism 201 controls the fluid temperature of the machining fluid 4 and is configured to include the cooling control device 12, the cooling device 11 (not shown), the work tank 1, the post-cooling temperature sensor 21, the intra-tank temperature sensor 22, and the like.

The cooling control device 12 according to the present embodiment has a first temperature-feedback control unit 31X and a second temperature-feedback control unit 33. The second temperature-feedback control unit 33 is arranged outside (on the side of a subsequent stage in time series) the first temperature-feedback control unit 31X and adjusts an instruction value of the first temperature-feedback control unit 31X. Specifically, the second temperature-feedback control unit 33 adjusts the instruction value of the first temperature-feedback control unit 31X based on a temperature instruction value for causing the machining fluid 4 to have a desired temperature and the fluid temperature (hereinafter, "intra-tank fluid temperature") measured by the intra-tank temperature sensor 22. In other words, the second temperature-feedback control unit 33 feeds back a difference between the intra-tank fluid temperature, which is the fluid temperature in the work tank 1, and the temperature instruction value into the instruction value of the first temperature-feedback control unit 31X. This realizes enhanced accuracy and enhanced responsiveness of the temperature control on the machining fluid 4.

To achieve highly accurate machining also in a case where the external environments (external temperature) change, the temperature in the work tank 1 is generally caused to follow the temperature of the machine structure 13. Accordingly, in the present embodiment, the temperature instruction value (follow instruction value) for causing the machining fluid 4 to have a desired temperature is set to, for example, the machine temperature measured by the machine temperature sensor 23. The temperature instruction value for causing the machining fluid 4 to have a desired temperature can be a temperature other than the machine temperature.

The first temperature-feedback control unit 31X adjusts the instruction value to be output to the cooling device 11 based on an instruction value output from the second temperature-feedback control unit 33 and the fluid temperature (hereinafter, "post-cooling fluid temperature") measured by the post-cooling temperature sensor 21. In other words, the first temperature-feedback control unit 31X feeds back the temperature of the machining fluid 4 immediately after being cooled by the cooling device 11 into the instruction value to be output to the cooling device 11. In this way, even when the heat generation amount varies according to machining processes during a temperature control on the machining fluid 4, the heat generation amount can be compensated.

The cooling device 11 cools the machining fluid 4 based on an instruction value output from the first temperature-feedback control unit 31X. A temperature disturbance is added to the machining fluid 4 cooled by the cooling device 11 and then the machining fluid 4 is supplied to the work tank 1. The temperature (intra-tank fluid temperature) of the machining fluid 4 in the work tank 1 is measured by the intra-tank temperature sensor 22 and is transmitted to the second temperature-feedback control unit 33.

Figure 3:
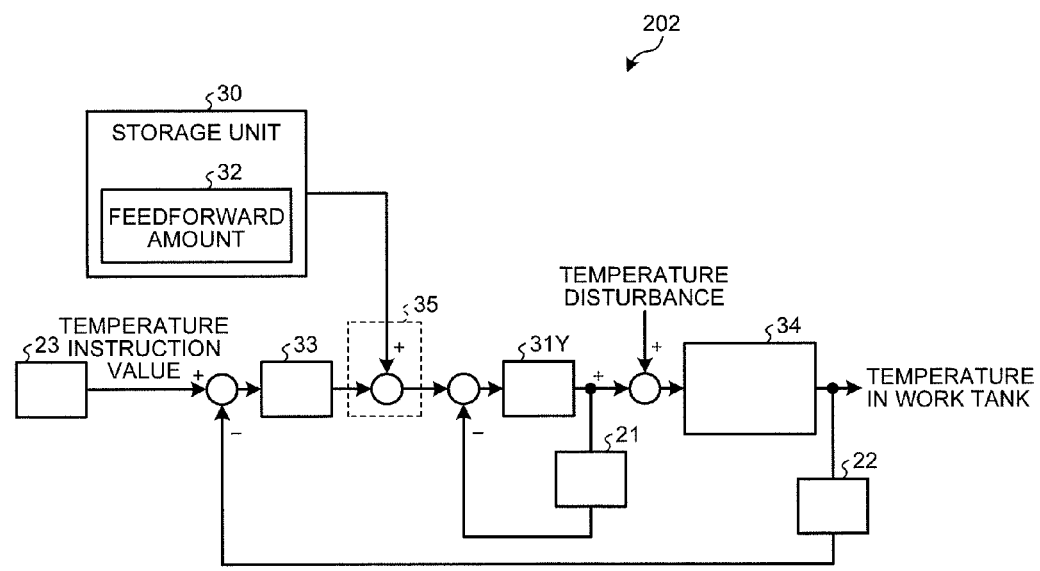
FIG. 3 is an explanatory diagram of a concept of a second example of the fluid-temperature control method according to the first embodiment.

The first temperature-feedback control unit 31X can generate the instruction value for the cooling device 11 using a feedforward amount for compensating the heat generation amount according to the machining process. FIG. 3 is an explanatory diagram of a concept of a second example of the fluid-temperature control method according to the first embodiment. Among constituent elements shown in FIG. 3, those exerting same functions as the fluid-temperature control mechanism 201 shown in FIG. 2 are denoted by same reference numerals and redundant explanations thereof will be omitted.

The wire electric discharge machining apparatus 101 in this example includes a fluid-temperature control mechanism 202. Compared to the fluid-temperature control mechanism 201, the fluid-temperature control mechanism 202 has a first temperature-feedback control unit 31Y instead of the first temperature-feedback control unit 31X. The fluid-temperature control mechanism 202 has a storage unit 30 and a feedforward control unit 35 outside the first temperature-feedback control unit 31Y. Accordingly, in the fluid-temperature control mechanism 202, a part of the fluid-temperature control mechanism 201 is altered.

The storage unit 30 is a memory or the like that stores therein a feedforward amount 32 for compensating the heat generation amount according to the machining process. A value corresponding to the heat generation amount in each machining process is set as the feedforward amount 32.

The feedforward control unit 35 adjusts an instruction value of the first temperature-feedback control unit 31Y based on an instruction value output from the second temperature-feedback control unit 33 and the feedforward amount 32 stored in the storage unit 30.

Specifically, the feedforward control unit 35 adds the feedforward amount 32 corresponding to the type of the machining process to an output value from the second temperature-feedback control unit 33. In other words, the feedforward control unit 35 feeds forward the feedforward amount 32 corresponding to the type of the machining process into the output value from the second temperature-feedback control unit 33. The first temperature-feedback control unit 31Y adjusts the instruction value to be output to the cooling device 11 based on an instruction value output from the feedforward control unit 35 and the post-cooling fluid temperature.

In this way, variations in the heat generation amount at the time of switching the types of the machining process (machining mode) can be promptly compensated. By performing heat generation compensation, the temperature in the work tank 1 can be caused to follow the temperature instruction value from the machine temperature sensor 23. Furthermore, variations in the temperature of the machining fluid 4 immediately after switching of the machining processes can be suppressed.

Figures 1, 4:
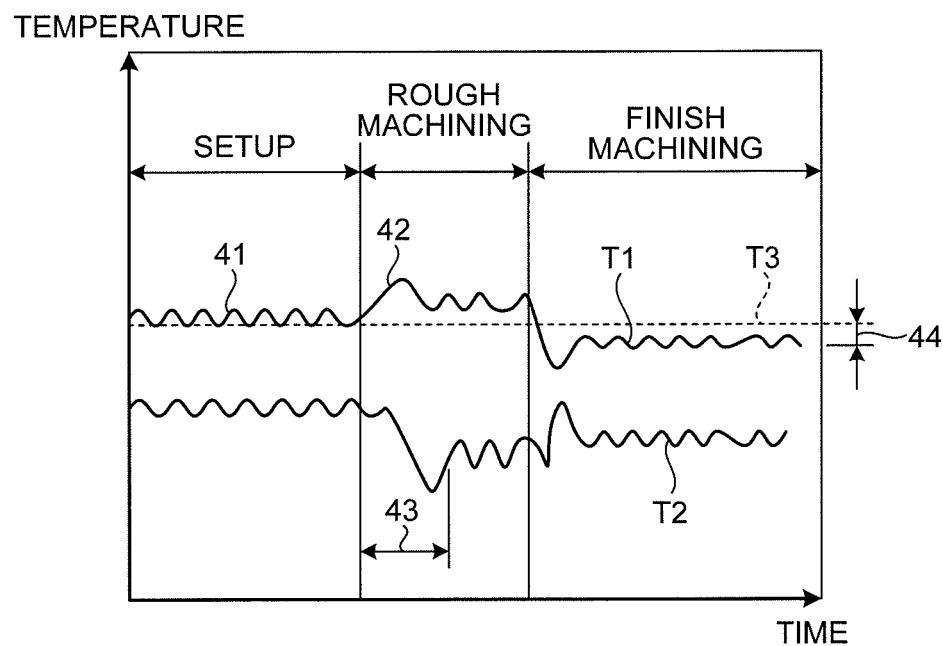
Figures 2, 4:
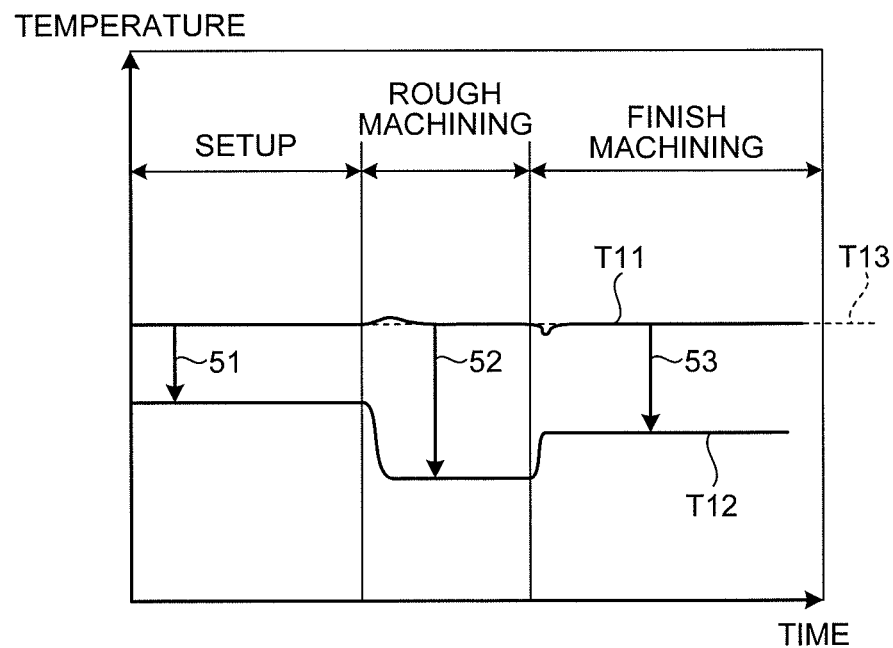

FIG. 4-1 depicts a result of a conventional fluid temperature control and FIG. 4-2 depicts a result of the fluid temperature control according to the first embodiment. In FIGS. 4-1 and 4-2, the horizontal axis represents the time and the vertical axis represents the temperature. In FIG. 4-1, a transition of a fluid temperature in a work tank is shown by a temperature transition T1, a transition of the fluid temperature at an outlet of a cooling device is shown by a temperature transition T2, and a transition of a machine temperature is shown by a temperature transition T3. In FIG. 4-2, a transition of the intra-tank fluid temperature is shown by a temperature transition T11, a transition of a fluid temperature (post-cooling fluid temperature) (cooling-device outlet temperature) at an outlet of the cooling device 11 is shown by a temperature transition T12, and a transition of the machine temperature is shown by a temperature transition T13. In FIGS. 4-1 and 4-2, fluid-temperature control results in a case where the machining process of wire electric discharge machining is performed in the order of a setup process, a rough machining process, and a finish machining process are shown.

In the conventional fluid-temperature control method, temperature variations 41 and 42 occur in the temperature transition T1 in the work tank and a lag 43 in control follow at the time of process switching occurs in the temperature transition T2 at the outlet of the cooling device. Furthermore, in the conventional fluid-temperature control method, a control error 44 occurs between the machine temperature (target temperature) and the fluid temperature in the work tank (between the temperature transition T3 and the temperature transition T1).

In the fluid-temperature control method according to the present embodiment, offset amounts for compensating the heat generation amount (at least either offset amounts before correction or offset amounts after the correction) are switched in each machining process (at the time of the setup process, at the time of the rough machining process, and at the time of the finish machining process). FIG. 4-2 shows a fluid-temperature control result obtained when a heat generation compensation 51 is performed at the time of the setup process, a heat generation compensation 52 is performed at the time of the rough machining process, and a heat generation compensation 53 is performed at the time of the finish machining process.

As shown by the temperature transition T11 in the work tank 1, there are almost no temperature variations. As shown by the temperature transition T12 of the post-cooling fluid temperature, almost no lag in control follow occurs when the machining processes are switched. Almost no control error occurs between the machine temperature (target temperature) and the intra-tank fluid temperature (between the temperature transition T13 and the temperature transition T11).

As described above, the intra-tank fluid temperature can be caused to always follow the machine temperature by switching the offset amounts for compensating the heat generation amount in each machining process. Furthermore, even when the heat generation amount rapidly changes when the machining processes are switched, a change in the intra-tank fluid temperature can be suppressed to the minimum.

Figure 5:
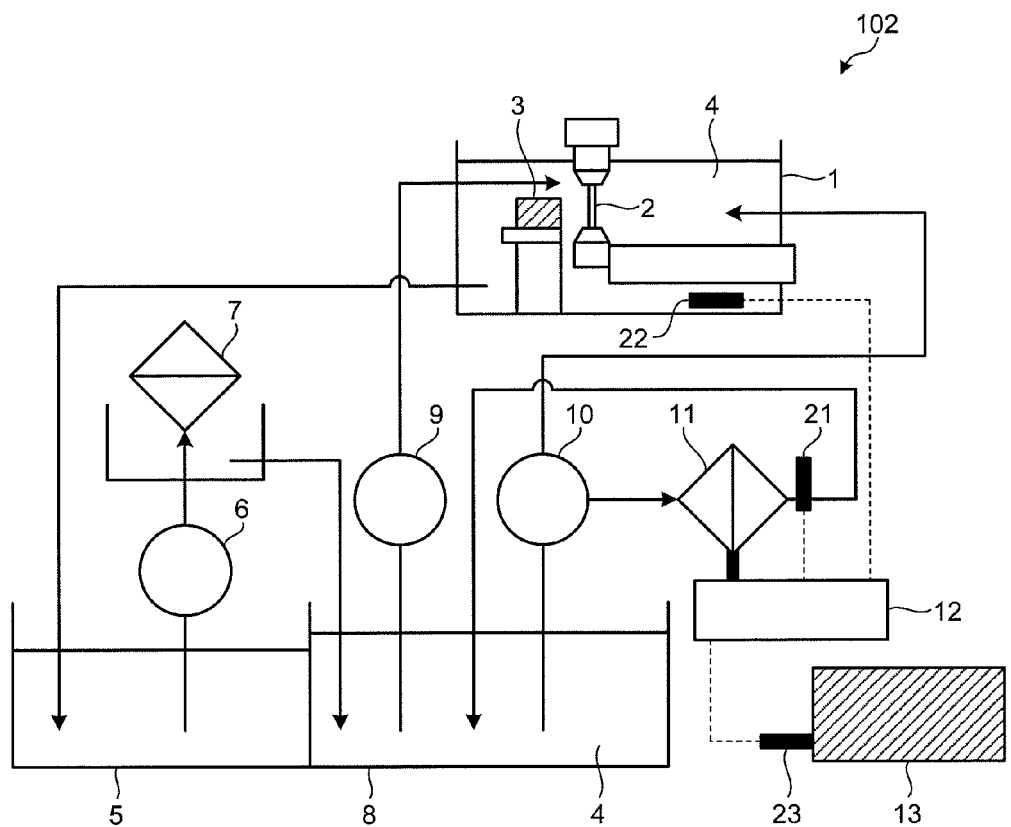
FIG. 5 is another configuration example of the wire electric discharge machining apparatus according to the first embodiment.

A machining-fluid supply system that supplies the machining fluid 4 to the work tank 1 is not limited to the configuration shown in FIG. 1. FIG. 5 is another configuration example of the wire electric discharge machining apparatus according to the first embodiment. Among constituent elements shown in FIG. 5, those exerting same functions as the wire electric discharge machining apparatus 101 shown in FIG. 1 are denoted by same reference numerals and redundant explanations thereof will be omitted. A wire electric discharge machining apparatus 102 has the same constituent elements as those in the wire electric discharge machining apparatus 101 shown in FIG. 1.

In the wire electric discharge machining apparatus 102, the machining fluid 4 in the clean fluid tank 8 is pumped up by the circulation pump 10 and the pumped machining fluid 4 is fed to the cooling device 11 and to the work tank 1. The machining fluid 4 fed to the cooling device 11 is subjected to a temperature control in the cooling device 11 and then returned to the clean fluid tank 8.

Even when the machining-fluid supply system has the configuration as in the wire electric discharge machining apparatus 102, an identical effect to that obtained in a case where the machining-fluid supply system has the configuration as in the wire electric discharge machining apparatus 101 is achieved. This is because, when the machining fluid 4 is supplied to the work tank 1, the machining fluid 4 always passes through the machining fluid pump 9 or the circulation pump 10, which is a heat generation element, and thus the compensation of the heat generation amount is required. Accordingly, the fluid-temperature control method according to the present embodiment is effective in all machining-fluid supply systems (machining-fluid circuit systems) that supply the machining fluid 4 via a pump.

As explained above, the wire electric discharge machining apparatuses 101 and 102 according to the present embodiment include the cooling control device 12 that controls the fluid temperature of the machining fluid 4 by controlling the cooling device 11. The wire electric discharge machining apparatuses 101 and 102 also include the post-cooling temperature sensor 21 that measures the temperature of the machining fluid 4 immediately after being cooled by the cooling device 11 as the post-cooling fluid temperature, and the intra-tank temperature sensor 22 that measures the temperature of the machining fluid 4 in the work tank 1 as the intra-tank fluid temperature.

The cooling control device 12 has the first temperature-feedback control unit 31X that feeds back the post-cooling fluid temperature into the cooling instruction value, which is an instruction value for causing the cooling device 11 to cool the machining fluid 4 to a predetermined temperature. The cooling control device 12 also has the second temperature-feedback control unit 33 that is arranged outside the first temperature-feedback control unit 31X and adjusts the cooling instruction value by feeding back the intra-tank fluid temperature to cause the intra-tank fluid temperature to follow the target temperature.

The storage unit 30 stores therein the feedforward amount 32 with respect to each of the types of the machining process. The feedforward control unit 35 adds the feedforward amount 32 corresponding to the type of the machining process to the instruction value of the first temperature-feedback control unit 31Y.

In this way, according to the first embodiment, the instruction value for the cooling device 11 is adjusted using the intra-tank fluid temperature and the post-cooling fluid temperature, which enhances responsiveness of the temperature control on the machining fluid 4 and suppresses variations in the intra-tank fluid temperature regardless of changes in the external environments. Therefore, the intra-tank fluid temperature can be matched with the target temperature.

Because the wire electric discharge machining apparatuses 101 and 102 adjust the instruction value to be output to the cooling device 11 using the feedforward amount 32, variations in the heat generation amount at the time of switching of the machining processes can be promptly compensated. This enables temperature variations in the machining fluid 4 immediately after switching of the machining processes to be suppressed. Therefore, the intra-tank fluid temperature can be promptly matched with the target temperature.

Because the intra-tank fluid temperature can be matched with the target temperature in this way, highly accurate machining and improved surface roughness can be realized and breaking of the wire electrode 2 can be prevented.

Second Embodiment

A second embodiment of the present invention is explained with reference to FIGS. 6 to 9. In the second embodiment, an initial offset amount is given to the instruction value for the cooling device 11. The initial offset amount is changed in each machining process. The initial offset amount is corrected according to a change in the external environments.

In the second embodiment, a fluid temperature control on the machining fluid 4 is executed using either the wire electric discharge machining apparatus 101 or 102 explained in the first embodiment. A case where a fluid temperature control on the machining fluid 4 is executed using the wire electric discharge machining apparatus 101 is explained below.

Figure 6:
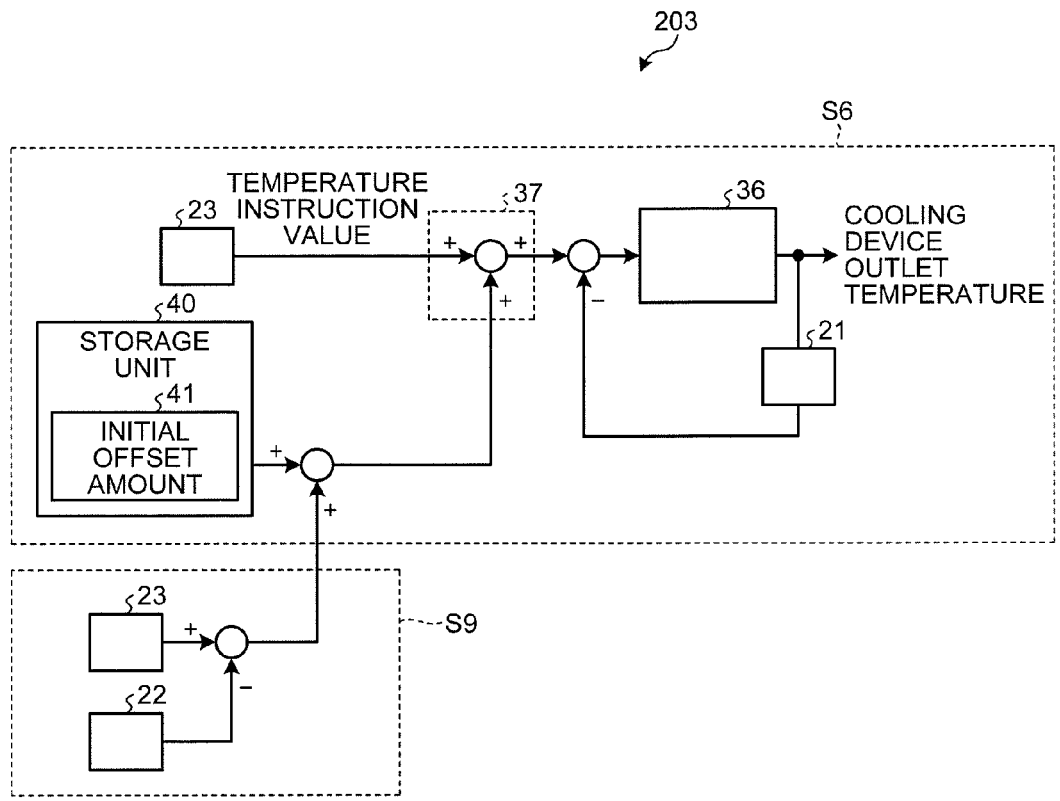
FIG. 6 is an explanatory diagram of a concept of a fluid-temperature control method according to a second embodiment.

FIG. 6 is an explanatory diagram of a concept of a fluid-temperature control method according to the second embodiment. The wire electric discharge machining apparatus 101 according to the present embodiment has a fluid-temperature control mechanism 203. The fluid-temperature control mechanism 203 controls the fluid temperature of the machining fluid 4 and is configured to include a storage unit 40, a cooling control unit 36, a correction unit 37, and the like. The storage unit 40, the cooling control unit 36, and the correction unit 37 are arranged in the cooling control device 12.

The storage unit 40 is a memory or the like that stores therein an initial offset amount 41 for compensating the heat generation amount. The initial offset amount 41 has values for compensating the heat generation amount generated in the machining processes. Accordingly, the initial offset amount 41 is set for each of the machining processes.

The cooling control unit 36 adjusts an instruction value to be output to the cooling device 11 based on a value obtained by adding the initial offset amount 41 to a machine temperature (temperature instruction value) measured by the machine temperature sensor 23, and on a fluid temperature (post-cooling fluid temperature) measured by the post-cooling temperature sensor 21.

Specifically, the cooling control unit 36 executes a temperature control to match the value obtained by adding the initial offset amount 41 to the temperature instruction value with the post-cooling fluid temperature. In this way, the cooling control unit 36 executes the temperature control with the heat generation amount compensated using the initial offset amount 41. Therefore, it is possible to enhance responsiveness of the temperature control on the machining fluid 4, to reduce temperature variations in the work tank 1, and to match the intra-tank fluid temperature with the machine temperature.

The correction unit 37 corrects the initial offset amount 41 using a difference (hereinafter, "fluid temperature difference") between the intra-tank fluid temperature measured by the intra-tank temperature sensor 22 and the machine temperature measured by the machine temperature sensor 23. Specifically, the fluid temperature difference is added to the initial offset amount 41. The correction unit 37 adds the corrected initial offset amount 41 to the instruction value for the cooling control unit 36.

Because the correction unit 37 corrects the initial offset amount 41 using the fluid temperature difference, the intra-tank fluid temperature can be caused to follow the machine temperature even when a change in the external environments occurs or the heat generation amounts in respective machining processes change.

The initial offset amount 41 explained above corresponds to the feedforward amount 32. The cooling control unit 36 corresponds to the first temperature-feedback control unit 31Y. The correction unit 37 corresponds to the second temperature-feedback control unit 33 and the feedforward control unit 35.

Processes performed by the cooling control unit 36 and the correction unit 37 correspond to a process at Step S6 explained later. A process of outputting the fluid temperature difference to the correction unit 37 corresponds to a process at Step S9 explained later.

The initial offset amount 41 is a value for compensating the heat generation amount generated in each machining process and thus, when the heat generation amount changes by switching of the machining processes, the initial offset amount 41 is also changed to a value corresponding to the changed machining process.

Figure 7:
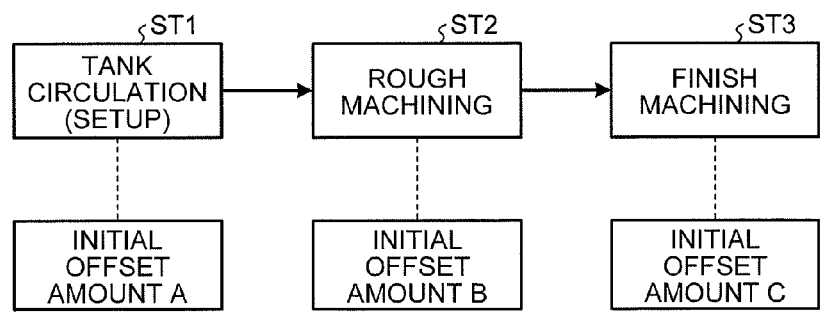
FIG. 7 depicts a correspondence relation between machining processes and initial offset amounts.

FIG. 7 depicts a correspondence relation between the machining processes and the initial offset amounts. The correction unit 37 generates the instruction value for the cooling control unit 36 using the initial offset amount 41 corresponding to the machining process. For example, in a setup process (tank circulation) (ST1), the machining fluid pump 9 stops and the circulation pump 10 operates in the machining-fluid supply system shown in FIG. 1. By supplying the machining fluid 4 only to a portion under a table in the work tank 1, a temperature averaging operation in the work tank 1 is started. Because heat generation of the machining fluid 4 caused by the operation of the circulation pump 10 is reduced by the cooling device 11, the heat generation amount generated in the work tank 1 is influenced only by an ambient temperature. Accordingly, an initial offset amount A corresponding to the influence of the ambient temperature is set in the setup process.

In a rough machining process (ST2), a large amount of the machining fluid 4 is supplied to the work tank 1 from the machining fluid pump 9 not through the cooling device 11. From the machining fluid pump 9, the machining fluid 4 is supplied into the work tank 1, for example, through upper and lower wire nozzles. Accordingly, an amount of heat generation of the machining fluid 4 caused by the operation of the machining fluid pump 9 and an amount of heat generation in the work tank 1 due to heat generation caused by electric discharge are considerably increased. Therefore, in the rough machining process, an initial offset amount B corresponding to the sum of the amount of heat generation caused by the operation of the machining fluid pump 9 supplying a large amount of the machining fluid 4 and the amount of heat generation caused by electric discharge is set.

In a finish machining process (ST3), while the machining fluid 4 is supplied from the machining fluid pump 9 not through the cooling device 11, the supply amount is reduced as compared to the rough machining process. Accordingly, while heat generation of the machining fluid 4 caused by the operation of the machining fluid pump 9 and heat generation caused by electric discharge occur as in the rough machining process, an amount of heat generation occurring in the work tank 1 decreases as compared to that in the rough machining process. Therefore, in the finish machining process, an initial offset amount C corresponding to the sum of the amount of heat generation caused by the operation of the machining fluid pump 9 supplying a smaller amount of the machining fluid 4 and the amount of heat generation caused by electric discharge is set. In this way, according to the present embodiment, the initial offset amount 41 for compensating the heat generation amount is previously set for each of the machining processes and the initial offset amounts 41 are switched in each of the machining processes.

Figure 8:
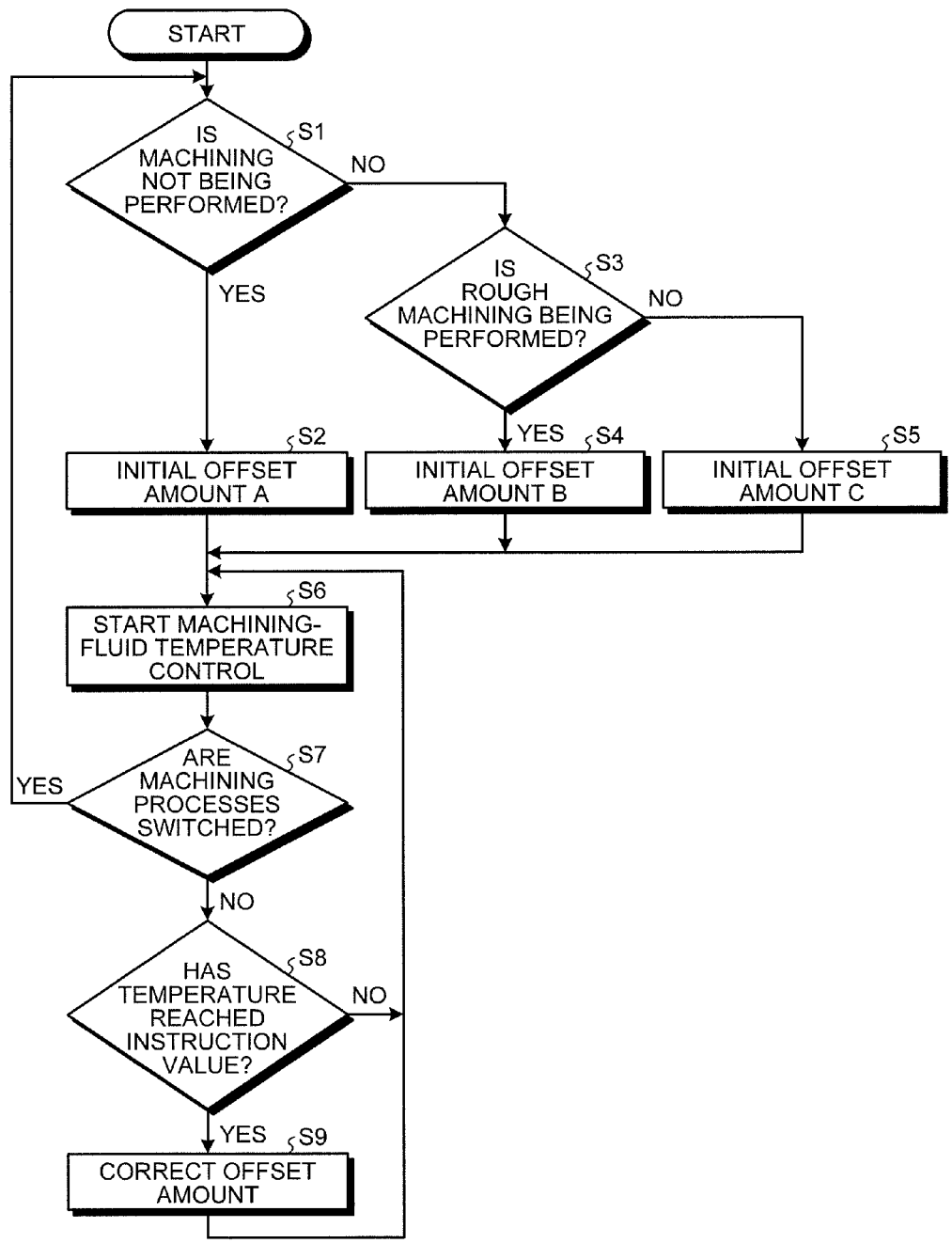
FIG. 8 is a flowchart of a fluid-temperature control process procedure in a case where initial offset amounts are switched in each of machining processes and the offset amount is corrected according to a change in external environments.

FIG. 8 is a flowchart of a fluid-temperature control process procedure in a case where the initial offset amounts are switched in each of the machining processes and the offset amount is corrected according to a change in the external environments. The offset amount in the present embodiment is at least one of the initial offset amount 41 before correction and the initial offset amount 41 after the correction. Because changes in the heat generation amount can be divided into that at the time of the setup process, that at the time of the rough machining process, and that at the time of the finish machining process, a fluid-temperature control process procedure in a case where the initial offset amounts 41 are switched in these three processes is explained as an example.

After the wire electric discharge machining apparatus 101 starts an operation, the cooling control device 12 determines whether the wire electric discharge machining apparatus 101 is performing machining (Step S1). When the machining is not being performed (YES at Step S1), the initial offset amount A is selected (Step S2). The fluid temperature control explained with reference to FIG. 3 is then executed (Step S6).

When the machining is being performed (NO at Step S1), the cooling control device 12 determines whether the rough machining is being performed (Step S3). When the rough machining is being performed (YES at Step S3), the initial offset amount B corresponding to the heat generation amount in the rough machining process is selected (Step S4). When the finish machining is being performed (NO at Step S3), the initial offset amount C corresponding to the finish machining process is selected (Step S5).

When the initial offset amount B or the initial offset amount C is selected, the fluid temperature control explained with reference to FIG. 3 is executed (Step S6). In this way, by selecting the optimum initial offset amount 41 for each of the machining processes, the intra-tank fluid temperature is caused to follow the machine temperature.

The cooling control device 12 monitors whether the machining process changes during the fluid temperature control. When the machining processes are switched (mode switching is performed) (YES at Step S7), the cooling control device 12 returns again to the flow of selecting the initial offset amount 41. Accordingly, the processes at Steps S1 to S6 are repeated.

While the initial offset amount 41 has a value obtained by compensating the heat generation amount, the actual heat generation amount may vary according to a change in the external environments. Therefore, the cooling control device 12 corrects the initial offset amount 41 based on the intra-tank fluid temperature (see FIG. 6). Specifically, when the machining processes are not switched (NO at Step S7), the cooling control device 12 (the correction unit 37) corrects the initial offset amount according to a change in the external environments. Immediately after the machining processes are switched, a deviation in the intra-tank fluid temperature is large. Therefore, after the machining processes are switched, the cooling control device 12 determines whether the fluid temperature measured by the post-cooling temperature sensor 21 has first reached an instruction value (hereinafter, "cooling instruction value") to be input to the cooling control unit 36 (Step S8). In other words, a period until the temperature of the fluid immediately after passing through the cooling device 11 first reaches the cooling instruction value is determined.

When the post-cooling fluid temperature has not first reached the cooling instruction value (NO at Step S8), the cooling control device 12 disables the feedback process by the second temperature-feedback control unit 33 or the process of correcting the offset amount using the fluid temperature difference (see FIG. 6).

After the post-cooling fluid temperature first reaches the cooling instruction value (YES at Step S8), the cooling control device 12 performs the process by the second temperature-feedback control unit 33, the process of correcting the initial offset amount 41 using the fluid temperature difference, or the process of further correcting the corrected initial offset amount 41 (see FIG. 6) (Step S9). In this way, stability in the fluid temperature control immediately after switching of the machining processes can be maintained.

The rough machining process and the finish machining process explained with reference to FIGS. 7 and 8 can be distinguished based on a setting value of the supply amount of the machining fluid 4 or a value of a flowmeter provided in a path for supplying the machining fluid 4. This is because heat generation occurring in the work tank 1 greatly depends on the amount of the machining fluid 4 supplied from the machining fluid pump 9. Therefore, instead of differentiating the offset amount (the initial offset amount or the corrected offset amount) between the rough machining process and the finish machining process, a table in which the offset amounts are finely set for respective supply amounts of the machining fluid 4 can be prepared. In this case, the supply amounts of the machining fluid 4 and the offset amounts are associated with each other in the table. The cooling control device 12 extracts one of the offset amounts corresponding to a supply amount of the machining fluid 4 from the table and uses the extracted offset amount for the fluid temperature control. The cooling control device 12 can calculate the offset amount corresponding to a supply amount of the machining fluid 4 with a calculation formula for calculating the offset amount using the supply amount of the machining fluid 4 as a variable.

FIG. 9 is a flowchart of a fluid-temperature control process procedure after the machining processes are switched. In FIG. 8, a flow for promptly switching to a control on the temperature in the work tank 1 according to a change in the heat generation amount when the heat generation amount changes due to switching of the machining processes is shown.

The cooling control device 12 has a function (a determination unit) of determining whether the post-cooling fluid temperature has first reached the cooling instruction value after the machining processes are switched. When the wire electric discharge machining apparatus 101 includes the fluid-temperature control mechanism 201 or the fluid-temperature control mechanism 202, the second temperature-feedback control unit 33 operates as the determination unit. When the wire electric discharge machining apparatus 102 includes the fluid-temperature control mechanism 203, the cooling control unit 36 operates as the determination unit.

After the machining processes are switched, the determination unit determines whether the post-cooling fluid temperature has first reached the cooling instruction value (Step S11). During a period until the post-cooling fluid temperature first reaches the cooling instruction value (NO at Step S11), the determination unit changes a control gain related to responsiveness of the temperature control to a high setting (sets a control parameter to a high gain) (Step S12). When the machining process remains unswitched (YES at Step S13), the determination unit proceeds to the next step with the control gain kept in a high setting state. When the machining processes are switched (NO at Step S13), the determination unit repeats the processes at Steps S11 to S14.

After the post-cooling fluid temperature reaches the instruction value (YES at Step S11), the determination unit changes the control gain to a low setting (Step S14) and proceeds to the next step. Because the control gain is set to a high value immediately after switching of the machining processes in this way, a responsiveness of the fluid temperature control can be enhanced. The control gain is set to a low value at the time of a normal fluid temperature control and thus a variation range of the fluid temperature can be suppressed.

With the fluid-temperature control method explained with reference to FIG. 8 or 9, the fluid-temperature control result as shown in FIG. 4-2 can be achieved. In the present embodiment, the intra-tank fluid temperature can be caused to always follow the machine temperature by switching the offset amount for compensating the heat generation amount for each machining process. Changes in the intra-tank fluid temperature can be suppressed to the minimum also with respect to a rapid change in the heat generation amount at the time of switching of the machining processes. Also in the present embodiment, an identical effect can be achieved not only for the machining-fluid supply system as shown in FIG. 1 but also for the machining-fluid supply system as shown in FIG. 5.

As explained above, the wire electric discharge machining apparatuses 101 and 102 according to the present embodiment include the machine temperature sensor 23 that measures the temperature of the machine structure 13 as the machine temperature. The instruction value to be followed is the machine temperature, for example. The cooling control device 12 includes the storage unit 40 that stores therein the initial offset amount 41 for compensating the heat generation amount. The cooling control unit 36 uses an instruction value obtained by adding the initial offset amount 41 to the machine temperature as the cooling instruction value and feeds back the post-cooling fluid temperature into the cooling instruction value.

The cooling control device 12 also includes the correction unit 37 that corrects the initial offset amount 41 using a difference between the intra-tank fluid temperature and the machine temperature. The cooling control device 12 disables the process performed by the second temperature-feedback control unit 33 to adjust the cooling instruction value until the post-cooling fluid temperature first reaches the cooling instruction value input to the first temperature-feedback control unit 31Y after the types of the machining process are switched.

The cooling control device 12 disables the process performed by the correction unit 37 to correct the offset amount until the post-cooling fluid temperature first reaches the cooling instruction value input to the first temperature-feedback control unit 31Y after the types of the machining process are switched.

The cooling control device 12 sets the control gain related to the responsiveness of the temperature control high during a period until the post-cooling fluid temperature first reaches the cooling instruction value input to the first temperature-feedback control unit 31Y after the types of the machining process are switched, and sets the control gain low after the post-cooling fluid temperature reaches the cooling instruction value.

The storage unit 40 stores therein the initial offset amount 41 for each of the types of the machining process, and the cooling control unit 36 uses an instruction value obtained by adding the initial offset amount corresponding to one of the types of the machining process to the machine temperature as the cooling instruction value.

As described above, according to the second embodiment, the temperature control is executed to match the value obtained by adding the initial offset amount 41 to the temperature instruction value with the post-cooling fluid temperature and therefore the temperature control responsiveness can be enhanced.

Because the initial offset amount 41 is corrected using the fluid temperature difference, variations in the intra-tank fluid temperature can be suppressed even when a change in the external environments occurs or the heat generation amounts in respective machining processes change.

Because the responsiveness of the temperature control on the fluid temperature can be enhanced and variations in the intra-tank fluid temperature can be suppressed in this way, the intra-tank fluid temperature can be caused to follow the machine temperature.

The feedback process using the post-cooling fluid temperature or the correction process for the offset amount using the fluid temperature difference is disabled until the post-cooling fluid temperature first reaches the cooling instruction value. Accordingly, even when a deviation in the temperature in the work tank 1 occurs immediately after switching of the machining processes, the fluid temperature control can be stabilized. Furthermore, the feedforward amount 32 and the offset amount for compensating the heat generation amount can be accurately corrected.

Because the control gain is set high until the post-cooling fluid temperature first reaches the cooling instruction value and the control gain is set low after the post-cooling fluid temperature reaches the cooling instruction value, a follow performance of the fluid temperature control can be enhanced even when the intra-tank fluid temperature changes due to a change in the heat generation amount immediately after switching of the machining processes.

Because the feedforward amount 32 and the initial offset amount 41 are changed to values corresponding to the machining process, the heat generation amount generated in each machining process can be appropriately compensated even when the machining processes are switched.

INDUSTRIAL APPLICABILITY

As described above, the wire electric discharge machining apparatus and the cooling control device according to the present invention are useful for performing a temperature control on a machining fluid.

REFERENCE SIGNS LIST 1 work tank, 2 wire electrode, 3 workpiece, 4 machining fluid, 5 dirty fluid tank, 6 filter pump, 7 filter, 8 clean fluid tank, 9 machining fluid pump, 10 circulation pump, 11 cooling device, 12 cooling control device, 13 machine structure, 21 post-cooling temperature sensor, 22 intra-tank temperature sensor, 23 machine temperature sensor, 30, 40 storage unit, 31X, 31Y first temperature-feedback control unit, 33 second temperature-feedback control unit, 35 feedforward control unit, 36 cooling control unit, 37 correction unit, 101, 102 wire electric discharge machining apparatus, 201 to 203 fluid-temperature control mechanism.

The invention claimed is:

1. A wire electric discharge machining apparatus comprising:
   a work tank that is filled with a machining fluid and in which a machining of a workpiece is performed;
   a machining-fluid supply device that supplies the machining fluid to the work tank;
   a cooling device that cools the machining fluid;
   a cooling control device that controls a fluid temperature of the machining fluid by controlling the cooling device;
   a post-cooling temperature sensor that measures a temperature of the machining fluid as of leaving the cooling device as a post-cooling fluid temperature; and an intra-tank temperature sensor that measures a temperature of the machining fluid in the work tank as an intra-tank fluid temperature, wherein the cooling control device includes a first temperature-feedback control unit that feeds back the post-cooling fluid temperature into a cooling instruction value that is an instruction value for causing the cooling device to cool the machining fluid to a predetermined temperature, and a second temperature-feedback control unit that is arranged outside the first temperature feedback control unit and adjusts the cooling instruction value by feeding back the intra-tank fluid temperature to cause the intra-tank fluid temperature to follow a target temperature.

2. The wire electric discharge machining apparatus according to claim 1, wherein the cooling control device further includes a first storage unit that is arranged outside the first temperature-feedback control unit and stores therein a feedforward amount for compensating a heat generation amount generated in a machining process, and a feedforward control unit that adds the feedforward amount to the cooling instruction value.

3. The wire electric discharge machining apparatus according to claim 1, further comprising a machine temperature sensor that measures a temperature of a machine structure as a machine temperature, wherein the target temperature is the machine temperature, and the cooling control device further includes a first storage unit that stores therein an offset amount for compensating the heat generation amount, and the first temperature-feedback control unit uses an instruction value obtained by adding the offset amount to the machine temperature as the cooling instruction value and feeds back the post-cooling fluid temperature into the cooling instruction value.

4. The wire electric discharge machining apparatus according to claim 3, wherein the cooling control device further includes a correction unit that corrects the offset amount using a difference between the intra-tank fluid temperature and the machine temperature.

5. The wire electric discharge machining apparatus according to claim 1, wherein the cooling control device disables a process performed by the second temperature-feedback control unit to adjust the cooling instruction value until the post-cooling fluid temperature first reaches a cooling instruction value input to the first temperature-feedback control unit after machining process types are switched.

6. The wire electric discharge machining apparatus according to claim 4, wherein the cooling control device disables a process performed by the correction unit to correct the offset amount until the post-cooling fluid temperature first reaches a cooling instruction value input to the first temperature-feedback control unit after machining process types are switched.

7. The wire electric discharge machining apparatus according to claim 1, wherein the cooling control device sets a control gain related to responsiveness of a temperature control high during a period until the post-cooling fluid temperature first reaches a cooling instruction value input to the first temperature-feedback control unit after machining process types are switched, and sets the control gain low after the post-cooling fluid temperature first reaches the cooling instruction value.

8. The wire electric discharge machining apparatus according to claim 2, wherein the first storage unit stores therein the feedforward amount for each of machining process types, and the feedforward control unit adds the feedforward amount corresponding to each of the machining process types to the cooling instruction value.

9. The wire electric discharge machining apparatus according to claim 3, wherein the first storage unit stores therein the offset amount for each of machining process types, and the first temperature-feedback control unit uses an instruction value obtained by adding the offset amount corresponding to each of the machining process types to the machine temperature as the cooling instruction value.

10. The wire electric discharge machining apparatus according to claim 5, wherein the machining process type is one of a setup process, a rough machining process, and a finish machining process.

11. A cooling control device for a wire electric discharge machining apparatus, the wire electric discharge machining apparatus including a work tank that is filled with a machining fluid and in which machining of a workpiece is performed, a machining-fluid supply device that supplies the machining fluid to the work tank, a cooling device that cools the machining fluid, a post-cooling temperature sensor that measures a temperature of the machining fluid as of leaving the cooling device as a post-cooling fluid temperature, and an intra-tank temperature sensor that measures a temperature of the machining fluid in the work tank as an intra-tank fluid temperature, wherein the cooling control device controls a fluid temperature of the machining fluid by controlling the cooling device, and the cooling control device comprises:

a first temperature-feedback control unit that feeds back the post-cooling fluid temperature into a cooling instruction value that is an instruction value for causing the cooling device to cool the machining fluid to a predetermined temperature; and a second temperature-feedback control unit that is arranged outside the first temperature feedback control unit and adjusts the cooling instruction value by feeding back the intra-tank fluid temperature to cause the intra-tank fluid temperature to follow a target temperature.

12. The wire electric discharge machining apparatus according to claim 7, wherein the machining process type is one of a setup process, a rough machining process, and a finish machining process.

* * * * *